United States Patent [19]
Boyer

[11] 3,916,221
[45] Oct. 28, 1975

[54] A.C. VOLTAGE DETECTOR WITH DELAYED TRIGGERING SIGNAL GENERATION

[75] Inventor: Marcel-Louis Boyer, Chatillon, France

[73] Assignee: Compagnie Industrielle des Telecommunication Cit-Alcatel, France

[22] Filed: Jan. 2, 1974

[21] Appl. No.: 429,816

[30] Foreign Application Priority Data

Dec. 29, 1972 France .............................. 72.47031

[52] U.S. Cl. ................ 307/231; 307/246; 307/293; 307/318

[51] Int. Cl.$^2$ .......................................... H03K 5/20

[58] Field of Search ........... 307/246, 293, 318, 231, 307/227, 235 R, 235 A; 328/26, 32

[56] References Cited

UNITED STATES PATENTS

| | | | |
|---|---|---|---|
| 2,877,401 | 3/1959 | Hansburg | 307/293 |
| 2,942,123 | 6/1960 | Schuh, Jr. | 307/293 |
| 3,045,150 | 7/1962 | Mann | 307/293 |
| 3,107,320 | 10/1963 | Brittain et al. | 307/293 |
| 3,121,803 | 2/1964 | Watters | 307/227 |
| 3,153,176 | 10/1964 | Clay | 307/293 |
| 3,281,534 | 10/1966 | Dersch | 307/231 |
| 3,653,018 | 3/1972 | Budrys | 307/231 |

*Primary Examiner*—Stanley D. Miller, Jr.
*Attorney, Agent, or Firm*—Craig & Antonelli

[57] ABSTRACT

Circuitry used in detecting a data signal on an electric transmission line includes a detector with a charge capacitor and a circuit comprising a diode, resistors and an auxiliary capacitor. Upon the appearance of a data signal at the input of the detector, the circuitry generates a delayed triggering signal at its output due to the parallel connection of the charge and auxiliary capacitors and the resulting large time constant of the circuitry. When the data signal ceases to appear, the diode becomes reverse biased by the charge having been stored on the auxiliary capacitor, and since the time constant of the circuitry is thereby made smaller, the provision of the triggering signal is rapidly ended.

10 Claims, 3 Drawing Figures

A.C. VOLTAGE DETECTOR WITH DELAYED TRIGGERING SIGNAL GENERATION

The invention comes within the branch of detector circuits which function to send out a continuous signal in response to receipt of a signal of a random type. It concerns, more particularly, a detector circuit providing a triggering signal on the arrival of a signal transmitting a data item and canceling the said signal when the signal transmitting the data item disappears. The invention applies to data transmission circuits at the input of a data processing element.

When a data processing element such as an electronic computer, for example, is connected at the output of a data transmission connection, it is necessary to allow a certain time to pass after the arrival of the first signal before the incident data items are taken into account by the computer. That delay, in the order of a few milliseconds, is necessary for establishing in the receiving mode, a synchronizing process, without which the incident signals are interpreted erroneously. When the connection is established, the computer is triggered by its coupler only on the expiration of that delay. On the other hand, when a transmission being made comes to an end, it is desirable for the triggering signal to be canceled as quickly as possible, to avoid the transmission of erroneous signals at the end of the message.

It is therefore necessary to insert between the input terminals of the line and the coupler of the computer an element which operates to detect the presence of a carrier, applying to the coupler a triggering signal delayed by a certain-time duration selected so as to ensure the synchronizing of the incident signals without losing useful data, and then enables as rapid a disappearance as possible of the triggering signal at the end of the transmission.

Simple circuits which ensure the reverse process are known, i.e., rapid establishing of a signal and slow disappearance thereof. This is the case, more particularly, of known circuits operating by charging a capacitor at a low time constant through a diode made conductive by the application of a signal thereto and then discharging the capacitor at a considerably lengthened time constant through the reverse impedance of the diode when the signal applied thereto is canceled.

On the other hand, no simple circuit providing a longer time constant on the establishing of a signal than at the disappearance thereof is known.

It is a known method, with a view to constituting a circuit fulfilling the above function, to use a detector known as a rapid detector having a diode, and a resistor and a capacitor with low values, low charge and discharge time constants to apply through separators, the voltage coming from the detector on an analog AND gate, on the one hand, directly, and on the other hand, through a delay circuit of the RC type having a long time constant adjusted to the required delay time. On the appearance of a signal, the delay circuit lengthens the transmission time on the output of the analog AND gate of the signal coming from the rapid detector. On the disappearance of the input signal, the direct branch transmits a zero to the analog gate which cancels the output signal.

The present invention provides a very much simpler solution for the problem and consists essentially in producing an establishing time constant having a first value on the appearance of the data signal by connecting a first capacitor in parallel with a second capacitor through a diode which is made conductive by the data signal, and a cut-out time constant having a lower value, the second capacitor alone remaining in circuit on the canceling of the data signal, which makes the diode nonconductive.

The invention will be explained in detail with reference to an example of a preferred embodiment facing the accompanying drawings, among which:

Figure 1:
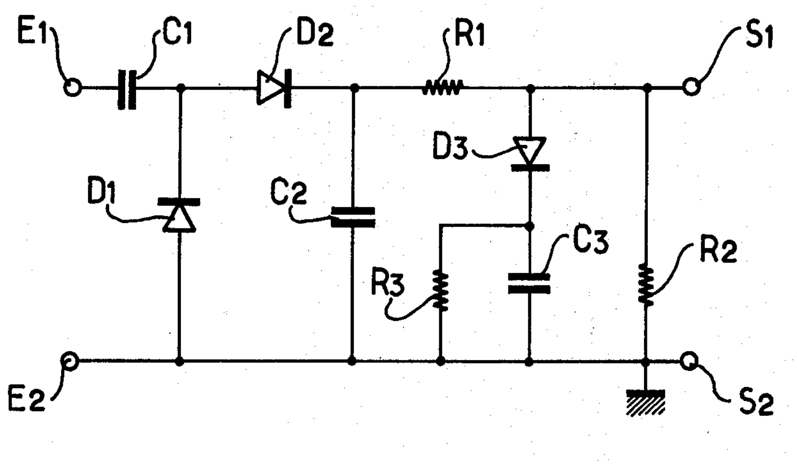
FIG. 1 is a schematic circuit diagram of a detector circuit according to the invention.

In FIG. 1, E1 and E2 are the input terminals of a detector circuit which contains as a principal element a known threshold type amplifier, not shown in the figures, but connected to the output terminals S1 and S2. A cell formed by a capacitor C1 in series, followed by a parallel connected diode D1 and a series connected diode D2, as well as a parallel connected capacitor C2 behind the diode D2, constitutes a peak-to-peak detector. There is then connected a resistor called the auxiliary resistor R1 in series with the detector circuit, followed by an output resistor R2 in parallel. The resistor R2 is connected in parallel with a shunt branch circuit comprising a diode D3 in series with a capacitor called the auxiliary capacitor C3, across which a resistor R3 is connected.

When a data signal appears at the input terminals E1, E2, the auxiliary capacitor C3 is not originally charged; therefore, the diode D3 becomes conductive as soon as the signal appears. Thus, the capacitor C3 is in parallel with resistor R2 and becomes charged; the voltage at the output terminals S1, S2 varies slowly, i.e., the circuit acts like a system having a time constant of large value.

When the input signal disappears at E1, E2, the diode D3 becomes blocked and the capacitor C3 is isolated. The capacitor C3 no longer being in parallel with R2, the time constant determined by C2, R1, R2 is then shorter than previous and the voltage at the terminals S1, S2 falls very fast. The capacitor C3 then discharges through resistor R3. The discharging of capacitor C3 is practically ended before the reestablishing of a new input signal.

With components having, for example, the following values: C1 = 0.1 $\mu$F, C2 = 0.1 $\mu$F, C3 = 2.2 $\mu$F, R1 = 5C K $\Omega$ an establishing time constant in the order of 80 ms and a cut-out time constant in the order of 16 ms are obtained.

The peak-to-peak detector at the input of the detector is an advantage due to the fact that it supplies an output voltage having the required polarity (+ in the case of FIG. 1) for controlling the state of the diode D3, whatever the direction of the connection E1, E2 may be.

Figure 2:
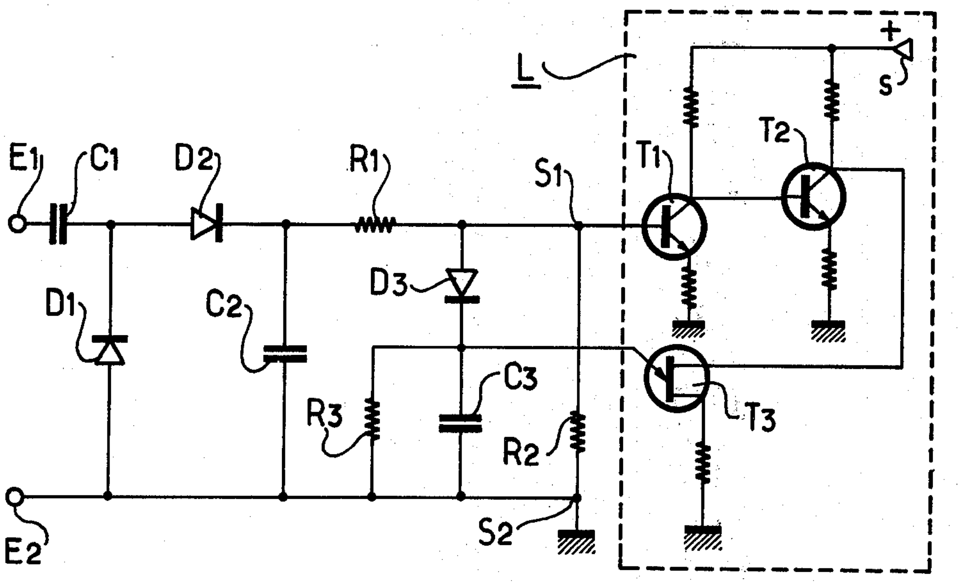
FIG. 2 is a schematic circuit diagram of the basic circuit according to FIG. 1 to which is added a rapid discharge circuit.

In FIG. 2, the basic diagram according to FIG. 1 is completed by a rapid discharge circuit L of known type with a view to reducing the discharge time to a very much lower value, making the discharge of the capacitor C3 take place rapidly via a discharge circuit which becomes conductive at the instant the signal applied to the terminals E1, E2 disappears. The discharge circuit L shown in FIG. 2 comprises an amplifier having two transistors T1 and T2 polarized by a voltage source S and controlled by the voltage at S1. These two transistors T1 and T2 ensure the controlling of the inter-base voltage of a unijunction transistor T3 whose emitter receives the voltage of capacitor C3.

The capacitor C3 is charged by the signal applied to the input terminals E1, E2. During the signal at E1, E2, the voltage at S1 being high, the inter-base voltage of the unijunction transistor T3 is high; the capacitor C3 remains charged.

When the voltage at S1 falls at the disappearance of the signal at E1, E2, the inter-base voltage of the unijunction transistor T3 falls; its emitter is brought to the high charge voltage of the capacitor C3; that unijunction transistor T3 then ensures the rapid discharging of the capacitor.

The peak-to-peak detector, according to FIGS. 1 or 2, may be used to great advantage in a transmitter-receiver unit with a two-phase coded signal. It enables the obtaining of signals compatible with the requirements of data transmissions without requiring coding in three states, while retaining the same time constant values, whatever the connection of the lines may be.

Figure 3:
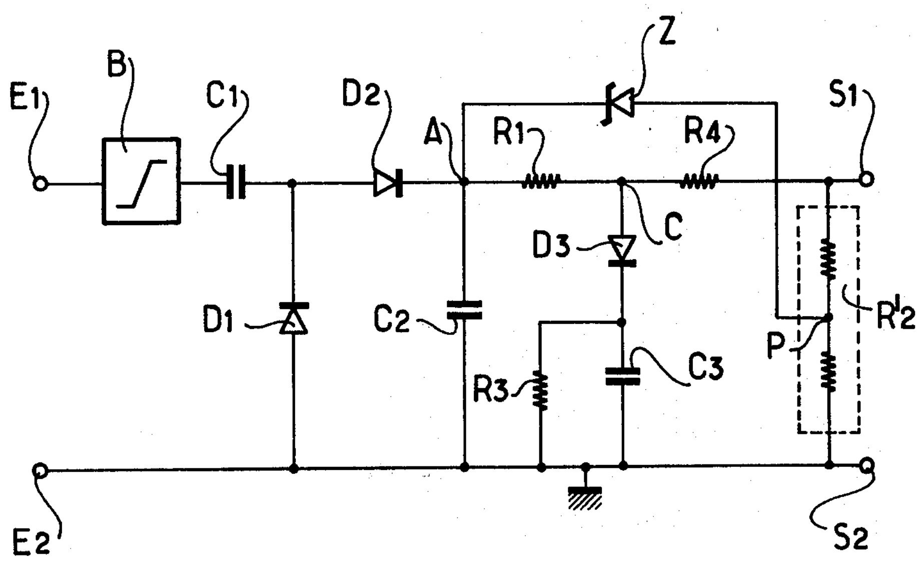
FIG. 3 is a schematic circuit diagram according to FIG. 1 which is modified to be independent from variations in the input amplitude.

FIG. 3 shows an adaptation of the input signal circuit where the amplitude of the input signal is variable. Indeed, it has been observed that with the circuit according to FIG. 1, time constants on triggering, which are widely variable as a function of the amplitude of the incident signal are obtained. To overcome that disadvantage, firstly, the inserting of a peak limiter B between the input E1 and the capacitor C1 is proposed. The threshold of that peak limiter is selected so that the maximum permissible voltage of the charge capacitor will be slightly higher than that necessary for triggering the final threshold amplifier which is connected to the terminals S1 and S2. By that peak limiter, the variation in the time constant is reduced to a value which is a function of the difference between the two thresholds.

Another measure for stabilizing the time constant on the triggering consists in connecting a Zener diode Z between a point A and an intermediate connection P of the output resistor R2′, the point A being situated at the connection between the rectifier and the resistor R1. In that case, it is moreover necessary to insert a summing resistor R4 between the output terminal S1 and a point C which is situated at the connection between the diode D3 and the auxiliary resistor R1.

The peak limiter B defines a level A max at the point A which is close to the rated voltage at A at which the triggering occurs. The Zener diode Z, on the other hand, generates a pre-sensitivization at S1, raising the voltage at P as soon as a rise at A appears correspondingly with that rise. The voltage at S1 is composed therefore on the one hand by a pre-sensitivization stage proportional to that rise and on the other hand by a fraction, defined by the resistors brought into play, of the exponential voltage which is observed at the auxiliary capacitor C3. If, therefore, the input amplitude is lower than the Zener voltage, the signal at S1 loses its pre-sensitivization stage and no longer exceeds the triggering threshold. Hence, the imprecision zone of the time constants is particularly slight.

The invention is not limited to the example of the embodiment described above. More particularly, the Zener diode may be replaced by one or several normal diodes which it is known also produce a threshold.

Another possibility for creating that pre-sensitivization consists in connecting, in the place of the Zener diode, a potentiometer whose intermediate connection is situated between a diode (or several diodes) and another resistor. On applying between the free terminals of the diode and of that resistor a polarization voltage such that the diode becomes conductive when there are no input pulses, a basic voltage which disappears as soon as a pulse arrives is generated at P.

What is claimed is:

1. A circuit for detecting an alternating current voltage comprising peak-to-peak detector means, responsive to the application of said alternating current voltage at its input, for generating at its output a direct current voltage having a value corresponding to the peak-to-peak voltage of said alternating current voltage; a series connection of a first resistor, a diode and a first capacitor connected across said output of said peak-to-peak detector means, said diode being reverse biased by said capacitor upon the termination of said application of said alternating current voltage; a second resistor connected across said first capacitor and an output resistor connected across the series circuit of said diode and said first capacitor, wherein said series connection introduces a delay in the appearance of said direct current voltage across said output resistor.

2. A circuit as defined in claim 1 wherein said peak-to-peak detector means includes a second diode in series with said first resistor, a third capacitor connected across said series connection of said first resistor, diode and first capacitor, and a third diode connected in series with said second diode across said third capacitor.

3. A circuit as defined in claim 2 wherein a rapid discharge circuit is connected across said output resistor.

4. A circuit as defined in claim 2 wherein a peak limiter circuit is connected in series with said second capacitor.

5. A circuit as defined in claim 4 wherein a third resistor is connected in series with said output resistor, and a Zener diode connected between the point of connection of said output resistor and said third resistor and the point of connection of said second diode and said third capacitor.

6. A circuit for detecting an alternating current voltage, comprising

- a peak-to-peak detector including first and second diodes and first and second capacitors, said first and second diodes connected in series across said second capacitor, and said first capacitor connected to the point of connection of said first and second diodes, an input of the circuit being applied to said point of connection through said first capacitor;
- a series connection of a first resistor, a third diode and a third capacitor, said series connection connected across said second capacitor; and
- a second resistor connected in parallel with said third capacitor, the output of the circuit being derived across the series connection of said third diode and said third capacitor.

7. A circuit as defined in claim 6, further comprising a rapid discharge circuit connected to said third capacitor.

8. A circuit as defined in claim 7, wherein said rapid discharge circuit includes an amplifier connected between a power source and the point of connection of said first resistor and said third diode, and a transistor connected between said amplifier and the point of connection of said third diode and said third capacitor.

9. A circuit as defined in claim 6, further comprising a peak limiter circuit connected in series with said first capacitor.

10. A circuit as defined in claim 9, further comprising a load resistor coupled across the series connection of said third diode and said third capacitor, a third resistor connected in series with said load resistor, and a Zener diode connected between said load resistor and the point of connection of said second diode and said second capacitor.

* * * * *